United States Patent [19]

Orner et al.

[11] Patent Number: 5,083,439
[45] Date of Patent: Jan. 28, 1992

[54] CONTROL DEVICE HAVING A SHAPE MEMORY WIRE, REFRIGERATOR SYSTEM UTILIZING THE CONTROL DEVICE AND METHODS OF MAKING THE SAME

[75] Inventors: Robert E. Orner, Stratford; Aurelio V. Cassarino, West Hartford; Roger P. Sepso, Stratford, all of Conn.

[73] Assignee: Robertshaw Controls Company, Richmond, Va.

[21] Appl. No.: 607,239

[22] Filed: Oct. 31, 1990

Related U.S. Application Data

[63] Continuation-in-part of Ser. No. 506,439, Apr. 6, 1990, Pat. No. 5,014,520.

[51] Int. Cl.⁵ .............................................. G05D 23/30
[52] U.S. Cl. .................................... 62/187; 236/68 R; 236/101 R; 251/11
[58] Field of Search ............... 236/101 R, 68 B, 68 R, 236/49.3; 62/187; 251/11, 294

[56] References Cited

U.S. PATENT DOCUMENTS

| | | | |
|---|---|---|---|
| 1,738,072 | 12/1929 | Kalle | 251/11 X |
| 3,680,306 | 8/1972 | Nikitin et al. | 251/11 X |
| 4,284,235 | 8/1981 | Diermayer et al. | 236/1 G |
| 4,530,216 | 7/1985 | Sepso | 62/89 |
| 4,819,442 | 4/1989 | Sepso et al. | 62/187 |

FOREIGN PATENT DOCUMENTS 11980  1/1950  Japan ................. 251/11
47710 10/1977  U.S.S.R. ............. 251/11

OTHER PUBLICATIONS

"Shower Gard" and Flow Gard sold by Memory Metals, Inc.
Known to Adjust Coiled Compression Shape Memory Spring with a Changing Spring Load Thereon.

Primary Examiner—William E. Tapolcai
Attorney, Agent, or Firm—Candor, Candor & Tassone

[57] ABSTRACT

A control device, refrigerator system utilizing the control device and methods of making the same are provided, the control device comprising a housing having a valve seat and having an inlet and an outlet interconnected together by the valve seat, a movable valve member carried by the housing and being adapted to open and close the valve seat by being respectively moved to an open position thereof and a closed position thereof, and a shape memory unit carried by the housing and being operatively interconnected to the valve member to move the valve member to one of the positions thereof by the unit sensing a temperature above a first temperature and to move the valve member to the other of the positions thereof by the unit sensing a temperature below a second temperature, the shape memory unit comprising a shape memory wire having opposed ends interconnected to the housing and having an intermediate portion thereof operatively interconnected to said valve member.

20 Claims, 6 Drawing Sheets

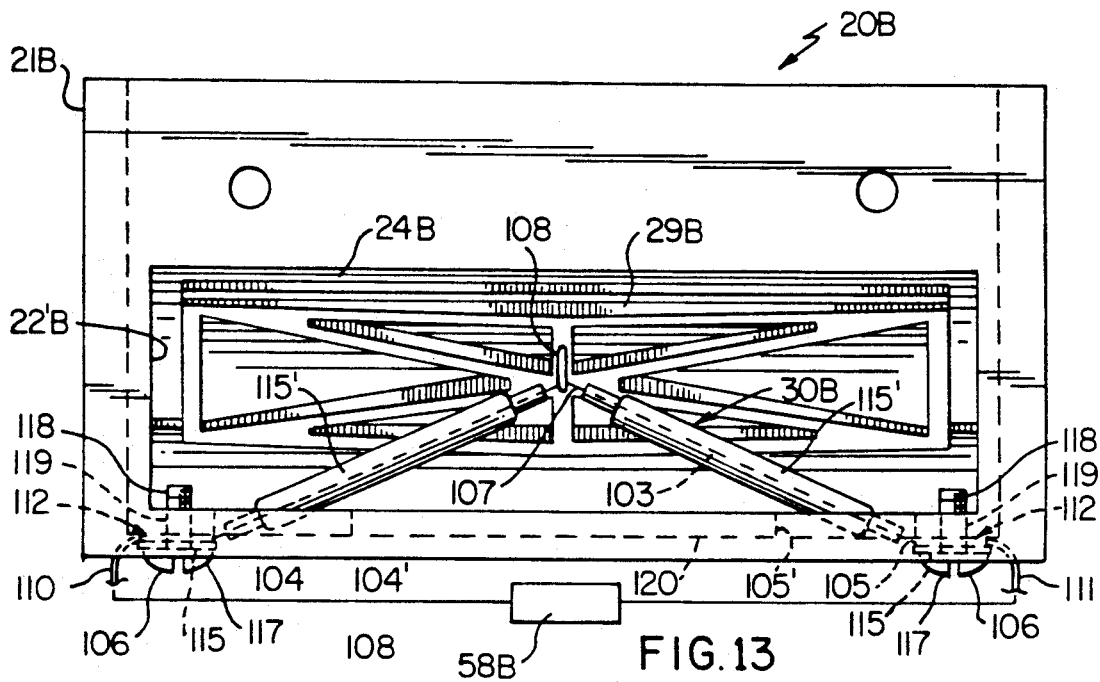
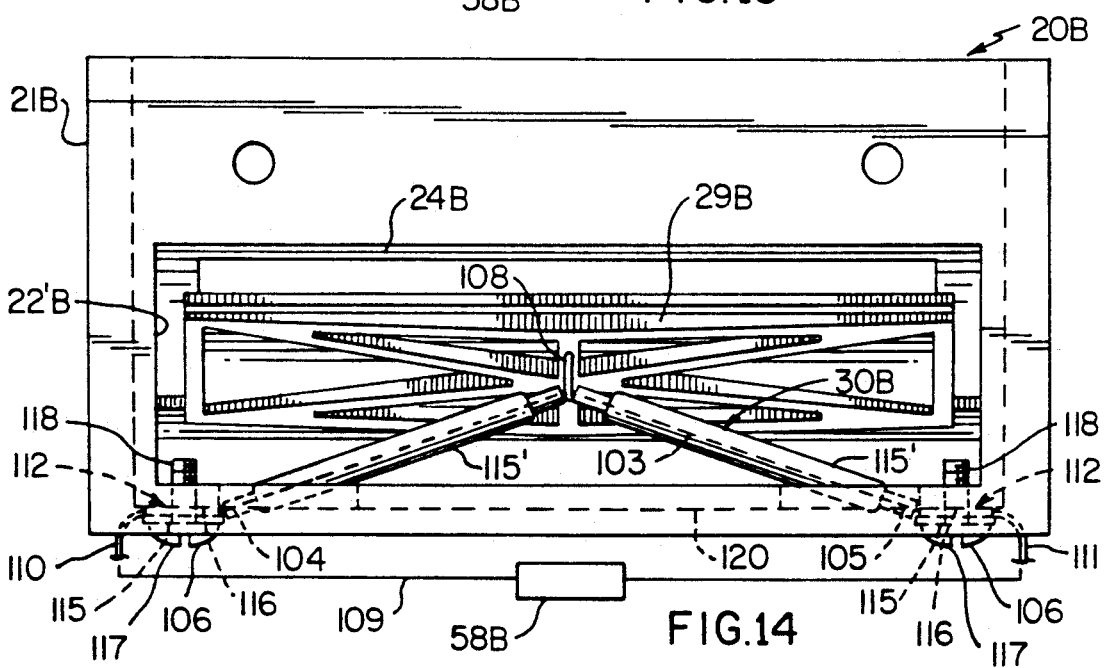
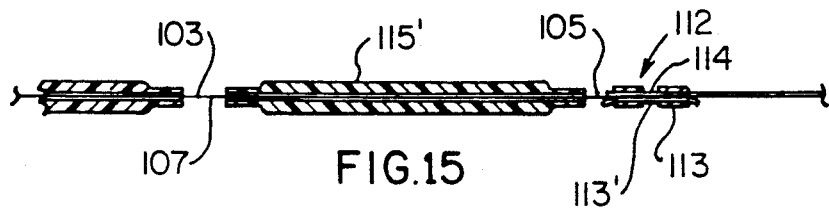

CONTROL DEVICE HAVING A SHAPE MEMORY WIRE, REFRIGERATOR SYSTEM UTILIZING THE CONTROL DEVICE AND METHODS OF MAKING THE SAME

CROSS REFERENCE TO RELATED APPLICATIONS

This application is a continuation-in-part patent application of its copending parent patent application, Ser. No. 506,439, filed Apr. 6, 1990, now U.S. Pat. No. 5,014,520.

BACKGROUND OF THE INVENTION

1. Field of the Invention

This invention relates to a new control device and to a new refrigerator system utilizing the new control device as well as to new methods of making such a control device and such a refrigerator system.

2. Prior Art Statement

It is known to provide a control device comprising a housing means having a valve seat means and having an inlet means and an outlet means interconnected together by the valve seat means, a movable valve member carried by the housing means and being adapted to open and close the valve seat means by being respectively moved to an open position thereof and a closed position thereof, and a shape memory means carried by the housing means and being operatively interconnected to the valve member to move the valve member to one of the positions thereof by the shape memory means sensing a temperature above a first temperature and to move the valve member to the other of the positions thereof by the shape memory means sensing a temperature below a second temperature. For example, see the U.S. Pat. No. 4,284,235 to Diermayer et al. Also such a control device has been utilized in a bathroom shower line or faucet line to close the line should the water temperature flowing through the line exceed a certain temperature, such devices being respectively sold by Memory Metals, Inc., of Stanford, Connecticut as a "Shower Gard" and a "Flow Gard".

It is also known to adjust the first temperature of such a device by placing a spring load on the coiled compression shape memory spring when the same is in its closed coil bound condition so that the same will not expand until the shape memory spring is heated a certain amount above that first temperature and that certain amount is selectively adjusted by selecting the spring force that is acting on the memory spring in its closed coil bound condition.

However, applicants are not aware of a use of such a coiled compression shape memory spring means in a refrigerator control device.

It is also known to provide a control device for a refrigerator system having a frozen food compartment and a nonfrozen food compartment interconnected together by an air circulating means that is adapted to direct an air flow from the frozen food compartment to the nonfrozen food compartment when a valve member of the control device is in an open condition thereof, the control device comprising a housing means having a valve seat means and having an inlet means for interconnecting to the frozen food compartment and an outlet means for interconnecting to the nonfrozen food compartment, the valve seat means interconnecting the inlet means and the outlet means together, a movable valve member carried by the housing means and being adapted to open and close the valve seat means by being respectively moved to an open position thereof and a closed position thereof, and actuator means carried by the housing means and being operatively interconnected to the valve member to move the valve member between the positions thereof. For example, see the U.S. Pat. No. 4,819,442, to Sepso et al., wherein the actuator means comprises a bellows means which has the fluid therein expanded by a temperature sensing bulb sensing the temperature in an area within a refrigerator and see the U.S. Pat. No. 4,530,216, to Sepso, wherein the fluid within the bellows is expanded by energizing an electrically operated heater means that heats the fluid in the bellows when the electrically operated heater means is so energized.

SUMMARY OF THE INVENTION

It is one of the features of this invention to provide a new control device that has unique shape memory means for actuating a valve member thereof In particular, it was found according to the teachings of this invention that a shape memory wire can have its opposed ends interconnected to the control device and have its intermediate portion operatively interconnected to the valve member to operate the same.

For example, one embodiment of this invention comprises a control device comprising a housing means having a valve seat means and having an inlet means and an outlet means interconnected together by the valve seat means, a movable valve member carried by the housing means and being adapted to open and close the valve seat means by being operatively moved to an open position thereof and a closed position thereof, and a shape memory means carried by the housing means and being operatively interconnected to the valve member to move the valve member to one of the positions thereof by the shape memory means sensing a temperature above a first temperature and to move the valve member to the other of the positions thereof by the shape memory means sensing a temperature below a second temperature, the shape memory means comprising a shape memory wire having opposed ends interconnected to the housing means and having an intermediate portion thereof interconnected to the valve member.

It is another feature of this invention to utilize a shape memory wire in a control device for a refrigerator system.

In particular, it was found according to the teachings of this invention that a shape memory wire can be utilized as the actuator means for controlling the opening and closing movement of a valve member that is disposed between a frozen food compartment and a nonfrozen food compartment of a refrigerator system.

For example, another embodiment of this invention comprises a control device for a refrigerator system having a frozen food compartment and a nonfrozen food compartment interconnected together by an air circulating means that is adapted to direct an air flow from the frozen food compartment to the nonfrozen food compartment when a valve member of the control device is in an open condition thereof, the control device comprising a housing means having a valve seat means and having an inlet means for interconnecting to the frozen food compartment and an outlet means for interconnecting to the nonfrozen food compartment, the valve seat means interconnecting the inlet means and the outlet means together, a movable valve member carried by the housing means and being adapted to open and close the valve seat means by being respectively moved to an open position thereof and a closed position thereof, and an actuator means carried by the housing means and being operatively interconnected to the valve member to move the valve member between the positions thereof, the actuator means comprising a shape memory wire having opposed ends interconnected to the housing means and having an intermediate portion thereof interconnected to the valve member so as to be adapted to move the valve member to the open position thereof by the wire sensing a temperature above a first temperature and to move the valve member to the closed position thereof by the wire sensing a temperature below a second temperature.

Accordingly, it is an object of this invention to provide a new control device having one or more of the novel features of this invention as set forth above or hereinafter shown or described.

Another object of this invention is to provide a new method of making such a control device, the method of this invention having one or more of the novel features of this invention as set forth above or hereinafter shown or described.

Another object of this invention is to provide a new control device for a refrigerator system, the control device of this invention having one or more of the novel features of this invention as set forth above or hereinafter shown or described.

Another object of this invention is to provide a new method of making such a control device for a refrigerator system, the method of this invention having one or more of the novel features of this invention as set forth above or hereinafter shown or described.

Another object of this invention is to provide a new refrigerator system having one or more of the novel features of this invention as set forth above or hereinafter shown or described.

Another object of this invention is to provide a new method of making such a refrigerator system, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 13 is a bottom view of the control device of FIG. 11, FIG. 13 being taken in the direction of the arrows 13—13 of FIG. 11 and being rotated 90°.

FIG. 14 is a view similar to FIG. 13 and is taken in the direction of the arrows 14—14 of FIG. 12.

FIG. 15 is a fragmentary cross-sectional view of the shape memory wire assembly for the control devices of FIGS. 10-14.

DESCRIPTION OF THE PREFERRED EMBODIMENTS

Figure 1:
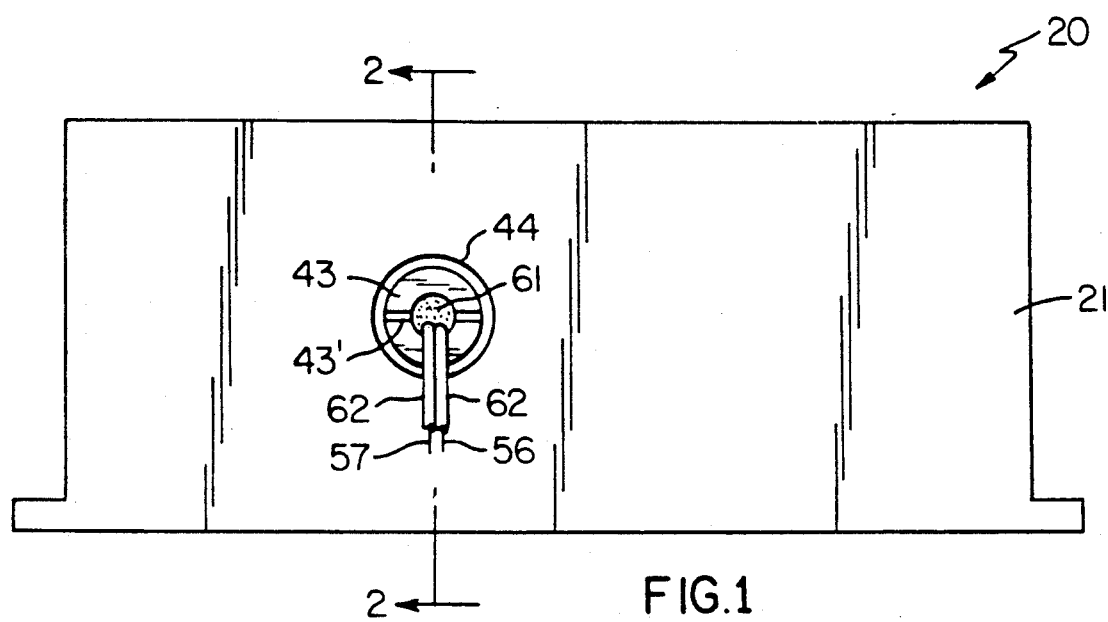
FIG. 1 is an end view of the new control device of this invention.

While the various features of this invention are hereinafter illustrated and described as being particularly adapted to provide a control device for a refrigerator system, it is to be understood that the various features of this invention can be utilized singly or in various combinations thereof to provide a control device for other types of systems as desired.

Therefore, this invention is not to be limited to only the embodiments illustrated in the drawings, because the drawings are merely utilized to illustrate one of the wide variety of uses of this invention.

Figure 2:
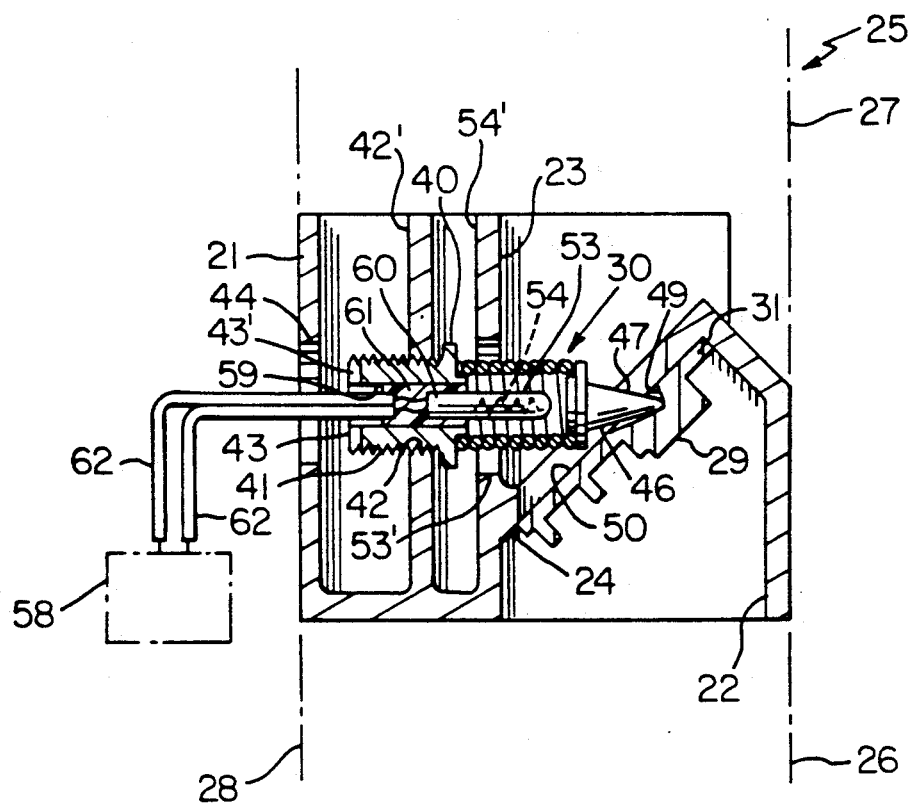
FIG. 2 is a cross-sectional view taken on line 2—2 of FIG. 1 and illustrates the control device of FIG. 1 in the refrigerator system of this invention that is schematically illustrated by dash-dotted lines.
Figures 3, 4, 5:
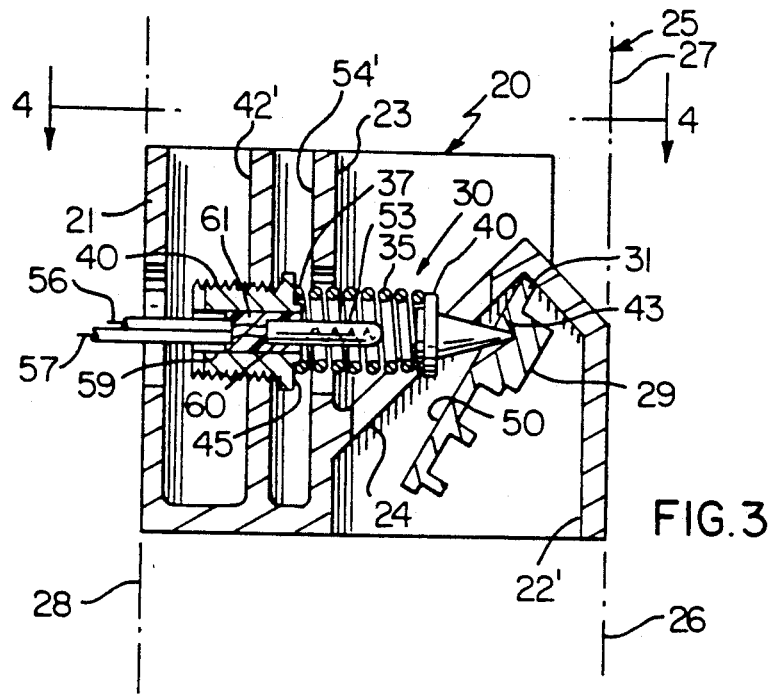
FIG. 3 is a view similar to FIG. 2 and illustrates the valve member of the control device in an open condition thereof.
FIG. 4 is an end view of the control device of FIG. 3 and is taken in the direction of the arrows 4—4 of FIG. 3.
FIG. 5 is an exploded perspective view of the parts of the actuator means of the control device of FIGS. 1-4.
Figure 6:
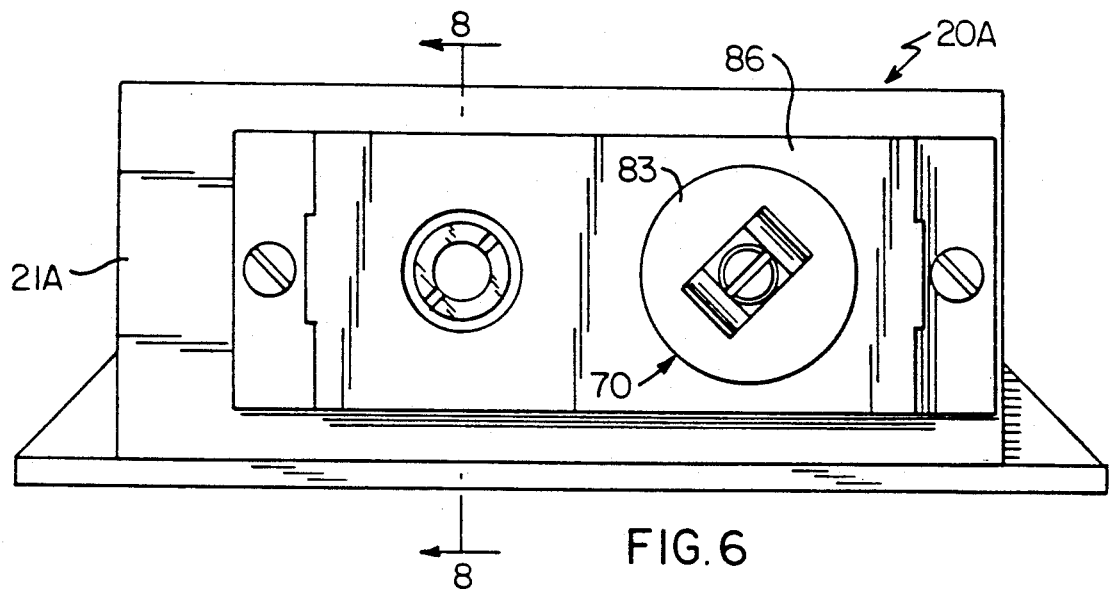
FIG. 6 is a view similar to FIG. 1 and illustrates another control device of this invention.

Referring now to FIGS. 1-5, a new control device of this invention is generally indicated by the reference numeral 20 and comprises a housing means 21 having an inlet means 22 and an outlet means 23 interconnected together by a valve seat means 24 of the housing means 21, the control device 20 of this invention being illustrated in FIG. 2 as being disposed in a refrigerator system that is generally indicated by the reference numeral 25 and comprising a frozen food compartment 26 that is interconnected to the inlet means 22 of the housing means 21 and a nonfrozen food compartment 27 that is interconnected to the outlet means 23 whereby a structure 28 of a refrigerator (not shown) utilizing the system 25 is adapted to circulate air from the frozen food compartment 26 to the nonfrozen food compartment 27 when a movable valve member 29 of the control device 20 is moved to an open position relative to the valve seat means 24 as illustrated in FIG. 3 by an actuator means of the control device that is generally indicated by the reference numeral 30.

The use of a control device for a refrigerator system is well known in the art. For example, see the aforementioned U.S. Pat. Nos. to Sepso 4,530,216, and Sepso et al., 4,819,442, whereby these two U.S. patents are being incorporated into this disclosure by this reference thereto. Thus, a further description of the reasons for a refrigerator control device and the operation thereof in a refrigerator system need not be further set forth.

The valve member 29 of the control device 20 is pivotally mounted to the housing means 21 in any suitable manner so that the same pivots at one end 31 thereof as illustrated in FIG. 3 between its open position of FIG. 3 and its closed position of FIG. 4 wherein the valve member 29 completely closes against the valve seat means 24 to prevent the circulation of air from the frozen food compartment 26 to the nonfrozen food compartment 27, the valve member 29 being urged to its closed position by a tension spring 32, FIG. 4, having one end 33 interconnected to the valve member 29 and its other end 34 interconnected to the housing means 21 in a manner well known in the art.

The actuator means 30 of the control device 20 of this invention comprises a unique feature of this invention and comprises a coiled compression shape memory spring 35 having helically wound coils 36 that define opposed open ends 37 and 38 thereof so that when the spring 35 is in the closed coil bound condition thereof as illustrated in FIGS. 2 and 5 wherein the coils 36 are disposed against each other, the spring 35 defines a substantially cylindrical chamber 39 therein, the spring 35 being in its closed coil bound condition of FIGS. 2 and 5 when the same is sensing a temperature below a certain temperature and axially expanding in the manner illustrated in FIGS. 3 and 4 when the spring 35 is sensing a temperature above another certain temperature. Such features of a coiled compression shape memory spring are well known in the art. For example, see the Shower Gard retrofit safety valve or Flow Gard faucet aerator of the aforementioned Memory Metals, Inc., of Stanford, Conn., whereby the details of how a coiled compression shape memory spring means is formed and how the same operates need not be further set forth as it is well known that shape memory material is first processed into a wire of appropriate diameter and then wound into a coil spring that is passed through a number of heat treatment procedures to establish the two-way memory characteristic thereof, so that the finished spring will have the coils thereof contract to its closed coil bound condition when sensing a temperature below a first certain temperature and will have its coils expand axially to an open coil condition thereof when the spring senses a temperature above a second certain temperature.

The actuator 30 of the control device 20 of this invention also comprises an adjusting member 40 that has an externally threaded shank portion 41 adapted to be threadedly disposed in an internally threaded opening 42 in a wall 42' of the housing means 21 so that the axial position of the adjusting member 40 can be readily accomplished by disposing a suitable tool in a slot means 43' in an end 43 of the adjusting member 40 and rotating the same in a conventional manner, the housing means 21 having an opening means 44 formed therein to permit access to the end 43 of the adjusting member 40 as illustrated.

The adjusting member 40 has its other end 45 formed in a disc-like shape and is adapted to be suitably secured to the end 37 of the spring 35 in any suitable manner so that the spring 35 will axially move with axial movement of the adjusting member 40, the adjusting member 40 thereby closing the end 37 of the chamber 39 in the spring 35 as illustrated.

The actuator means 30 of the control device 20 of this invention also comprises a plunger member 46 that has a conical end 47 provided with an apex 48 that is adapted to be disposed in a notch or depression 49 formed in one side 50 of the valve member 29 in the manner illustrated in FIG. 2 while its other end 51 comprises a reduced cylindrical portion that is adapted to be disposed in the end 38 of the spring 35 to close the end 38 thereof If desired, the end 51 of the plunger member 46 can be secured to the end 38 of the spring 35 in any suitable manner. In any event, an intermediate disc-like portion 52 of the plunger member 46 is disposed against the last coil 36 at the end 38 of the spring 35 and thereby causes the plunger member 46 to move with the end 38 of the spring 35.

In this manner, the actuator means 30 of the control device 20 of this invention is adjusted in its axial position in the housing means 21 in such a manner that the spring 35 and plunger member 46 can project through an opening 53' in another wall 54' of the housing means 21 and have the apex 48 of the plunger member 46 received in the depression 49 of the valve member 29 and permit the valve member 29 to be disposed in its closed condition against the valve seat means 24 under the force of the tension spring 32 when the spring 35 is sensing a temperature below a temperature that causes the spring 35 to have the coils 36 thereof disposed in a closed coil bound condition as illustrated in FIG. 2. However, when the spring 35 senses a temperature above a certain temperature, the spring 35 has the coils 36 thereof expand axially in the manner illustrated in FIGS. 3 and 4 to pivot the valve member 29 to an open position thereof in opposition to the force of the tension spring 32 and thereby permit the frozen food compartment 26 to be interconnected to the nonfrozen food compartment 27 by the air circulating means 28 so as to tend to maintain the temperature in the nonfrozen compartment 27 at a desired temperature for the refrigerator system 25 all in a manner well known in the art.

The actuator means 30 of the control device 20 of this invention also comprises an electrically operated heater means 53 that is adapted to heat the spring means 35 to a temperature that causes axial expansion thereof when the heater means 53 is energized for a certain time period. For example, the heater means 53 in the embodiment illustrated in the drawings comprises a resistance wire 54 carried within a suitable electrically insulating member 55 that is readily heat conductive and is adapted to have its opposed ends respectively interconnected to electrical leads 56 and 57 that will pass electrical current through the resistor wire 54 when a control means 58, FIG. 2, determines that the valve member 29 of the control device 20 in the refrigerator system 20 should be disposed in an open condition thereof so as to decrease the temperature in the nonfrozen food compartment 27 as the temperature therein has risen above the desired temperature setting of the control means 58 for the nonfrozen food compartment 27, the control means 58 terminating the flow of current through the resistance wire 54 when the control means 58 has determined that the valve member 29 should be disposed in a closed position thereof so as to prevent the colder air from the frozen food compartment 26 from being circulated to the nonfrozen food compartment 27 as the temperature in the nonfrozen food compartment 27 has now fallen below the desired temperature setting thereof.

While the heater means 53 can be carried by the actuator means 30 in a suitable manner, the embodiment thereof illustrated in the drawings has an opening 59 passing completely through the opposed ends 43 and 45 of the adjusting member 40 so that an end 60 of the heater means 53 can be disposed in the opening 59 and be sealed therein by suitable resin adhesive means 61 or the like to not only seal closed the passage 59 but also to hold the heater means 53 in place so that at least a part of the resistor wire means 54 is completely disposed within the chamber 39 of the spring 35 when the spring 35 is in the closed coil bound condition illustrated in FIG. 2.

In this manner, it is believed that because the chamber 39 in the spring 35, while the spring 35 is in its closed coil bound condition of FIG. 2, is substantially closed from the surrounding air, the energizing of the heater wire 54 by the control means 58 will rapidly heat up the spring 35 to cause the same to expand axially to open the valve member 29 in the manner illustrated in FIGS. 3 and 4 as the heater wire means 54 is initially isolated from the colder air surrounding the spring 35 by being disposed inside the spring 35 rather than external thereto as in the aforementioned U.S. Pat. No. 4,530,216 to Sepso.

The sealing epoxy means or resin 61 also attaches the leads 56 and 57 to the adjusting member 40 while the leads 56 and 57 can extend out of the end 43 of the adjusting member 40 to be interconnected to the control means 58 in any suitable manner, the leads 56 and 57 being insulated by suitable insulating means 62 in a manner well known in the art.

Therefore, it can be seen that the control device 20 of this invention and the refrigerator system 25 of this invention can each be made by the method of this invention as previously set forth in a simple and effective manner to operate in a manner now to be described.

With the control device 20 mounted in the air circulated means 28 of a refrigerator (not shown) and with the control means 58 being arranged to cause the valve member 29 to move to an open condition when the temperature in the nonfrozen food compartment 27 is above a selected temperature, the control means 58 will pass an electrical current through the resistance wire 54 of the heater means 53 when the temperature in the frozen food compartment 26 is above the selected temperature thereof so that the heater means 53 will heat the air in the chamber 39 of the spring 35 while the same is in its closed coil bound condition of FIGS. 2 and 5 so as to heat the spring means 35 to a temperature above a certain temperature to cause the spring 35 to axially expand in the manner illustrated in FIGS. 3 and 4 to hold the valve member 29 in an open condition thereof and thereby lower the temperature in the nonfrozen food compartment 27 as the colder air from the frozen food compartment 26 is circulated through the opened valve seat means 24 to the nonfrozen food compartment 27. With the spring 35 in the axially expanded condition of FIGS. 3 and 4, it is believed that the continued energization of the heater means 53 in such a condition will maintain the spring means 35 in its axially expanded condition thereof as long as an electrical current is being passed through the heater wire means 54. However, once the control means 58 senses that the temperature in the nonfrozen food compartment 27 has now fallen below the selected temperature thereof, the control means 58 terminates the flow of electrical current through the resistance wire 54 of the heater means 53 so that the air now circulating over the spring 35 reduces the temperature thereof to a temperature that causes the spring 35 to contract and move to its closed coil bound condition as illustrated in FIGS. 2 and 5 whereby the tension spring 32 causes the valve member 29 to follow such movement of the plunger member 46 and thereby close the valve member 29 against the valve seat means 24 to terminate the flow of air from the frozen food compartment 26 to the nonfrozen food compartment 27.

Thus, the control means 58 will readily cycle the opening and closing of the valve member 29 in the above manner to tend to maintain the temperature in the nonfrozen food compartment 27 at the temperature that was selected for the control means 58.

Another refrigerator control device of this invention is generally indicated by the reference numeral 20A in FIGS. 6–9 and parts thereof similar to the control device 20 previously set forth are indicated by like reference numerals followed by the reference letter "A".

It can be seen that the control device 20A comprises a housing means 21A adapted to be disposed in an air circulating means 28A of a refrigerator (not shown) and thereby form part of the refrigerator system 25A thereof in a manner similar to the control device 20A.

However, it can also be seen that the control device 20 previously set forth is of the type that is set forth in the aforementioned U.S. Pat. No. 4,530,216, to Sepso, whereas the control device 20A is of the type that is set forth in the aforementioned U.S. Pat. No. 4,819,442, to Sepso et al., wherein a temperature selector means that is generally indicated by the reference numeral 70 is carried by the housing means 21A and comprises a pivotally mounted lever 71 having an end 72 bearing against an enlarged end 73 of an axially movable plunger member 74 that has a conical end 75 provided with an apex 76 that bears against an abutment 77 of the valve member 29A to control the pivoting movement thereof in the same manner as the conical end 47 of the plunger member 46 previously set forth. The selector means 70 also includes a tension spring 78 having one end 79 interconnected to the lever 71 that pivots at the end 80 thereof and another end 81 threadedly interconnected to a threaded adjusting member 82 that is adapted to be rotated by a selector knob means 83 in a manner well known in the art whereby the force of the tension spring 78 tending to move the actuator member 74 downwardly in FIG. 7 can be adjusted and thereby is in effect selecting the temperature that must be sensed by the actuator means 30A to cause opening of the valve member 29A in a manner hereinafter set forth.

The actuator means 30A of the control device 20A comprises a coiled compression shape memory spring 35A and an adjusting member 40A secured to the end 37A of the spring 35A and being threadedly disposed in a threaded opening 84 in a wall 85 of a bracket means 86 secured to the housing means 21A and forming a part thereof as illustrated, the bracket means 86 also carrying the selector means 70 as illustrated.

Figure 8:
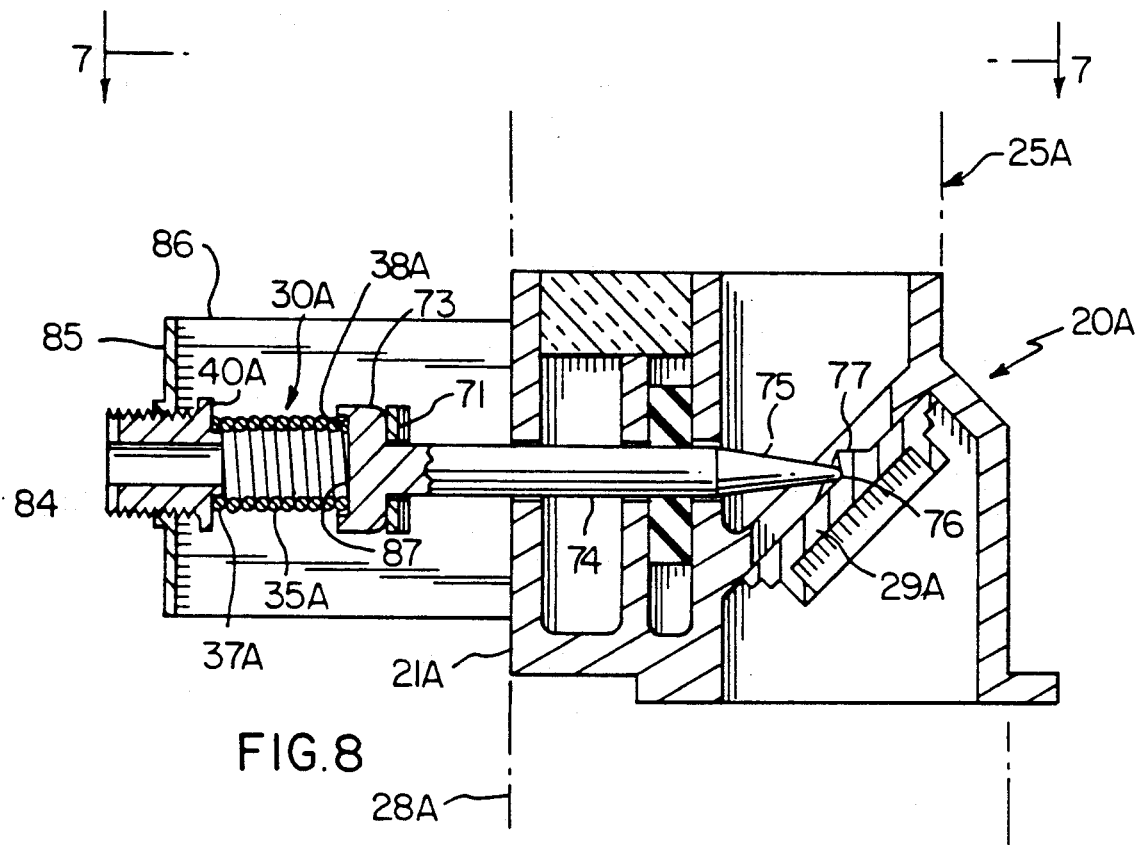
FIG. 8 is a view similar to FIG. 2 and is a cross-sectional view taken on line 8—8 of FIG. 6.
Figure 9:
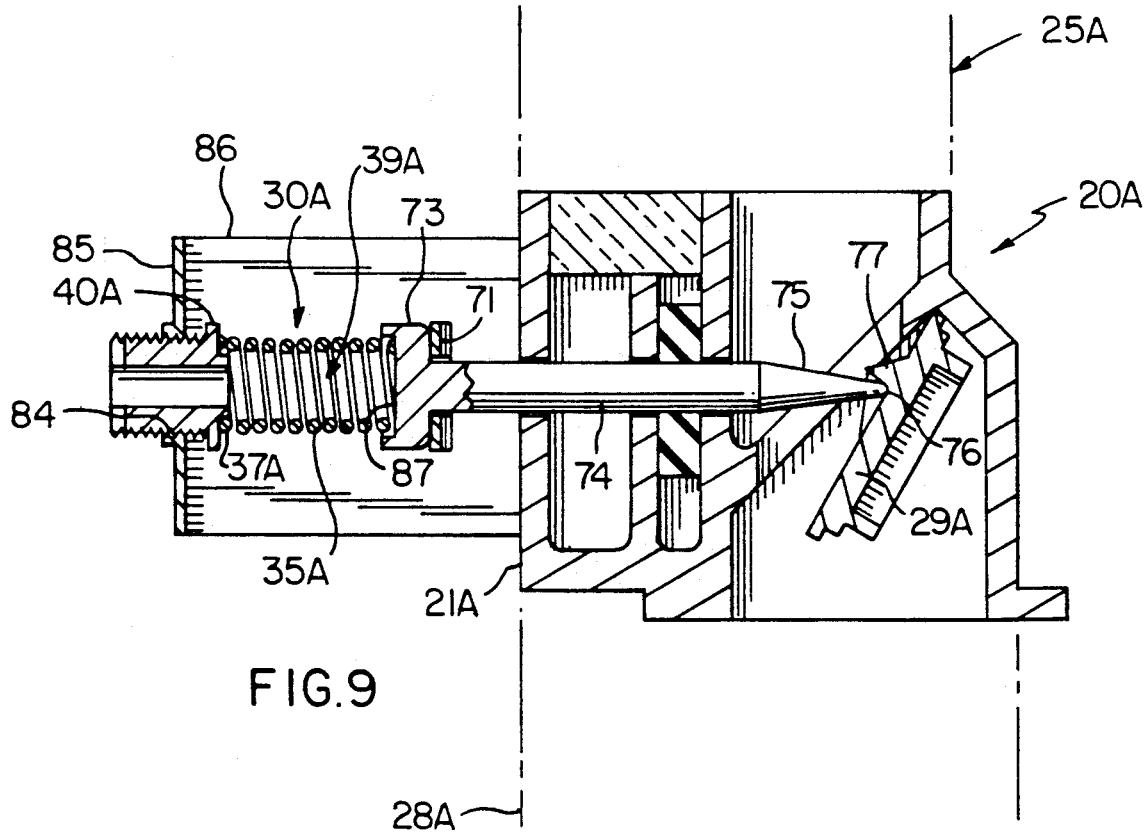
FIG. 9 is a view similar to FIG. 8 and illustrates the valve member in an open condition thereof.
Figure 10:
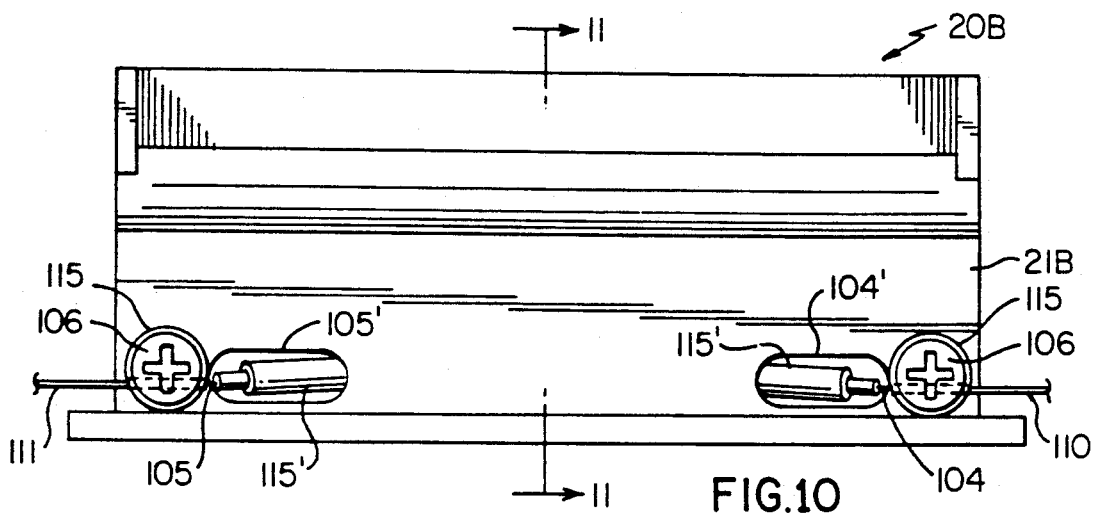
FIG. 10 is an end view of another control device of this invention, FIG. 10 being taken in the direction of the arrows 10—10 of FIG. 11.

The end 73 of the actuator or plunger 74 has a recess 87 formed therein in the manner illustrated in FIGS. 8 and 9 and receives the end 39A of the spring 35A therein with the end 39A either being secured to the end 73 of the actuator 74 or being unsecured thereto as desired.

Figure 7:
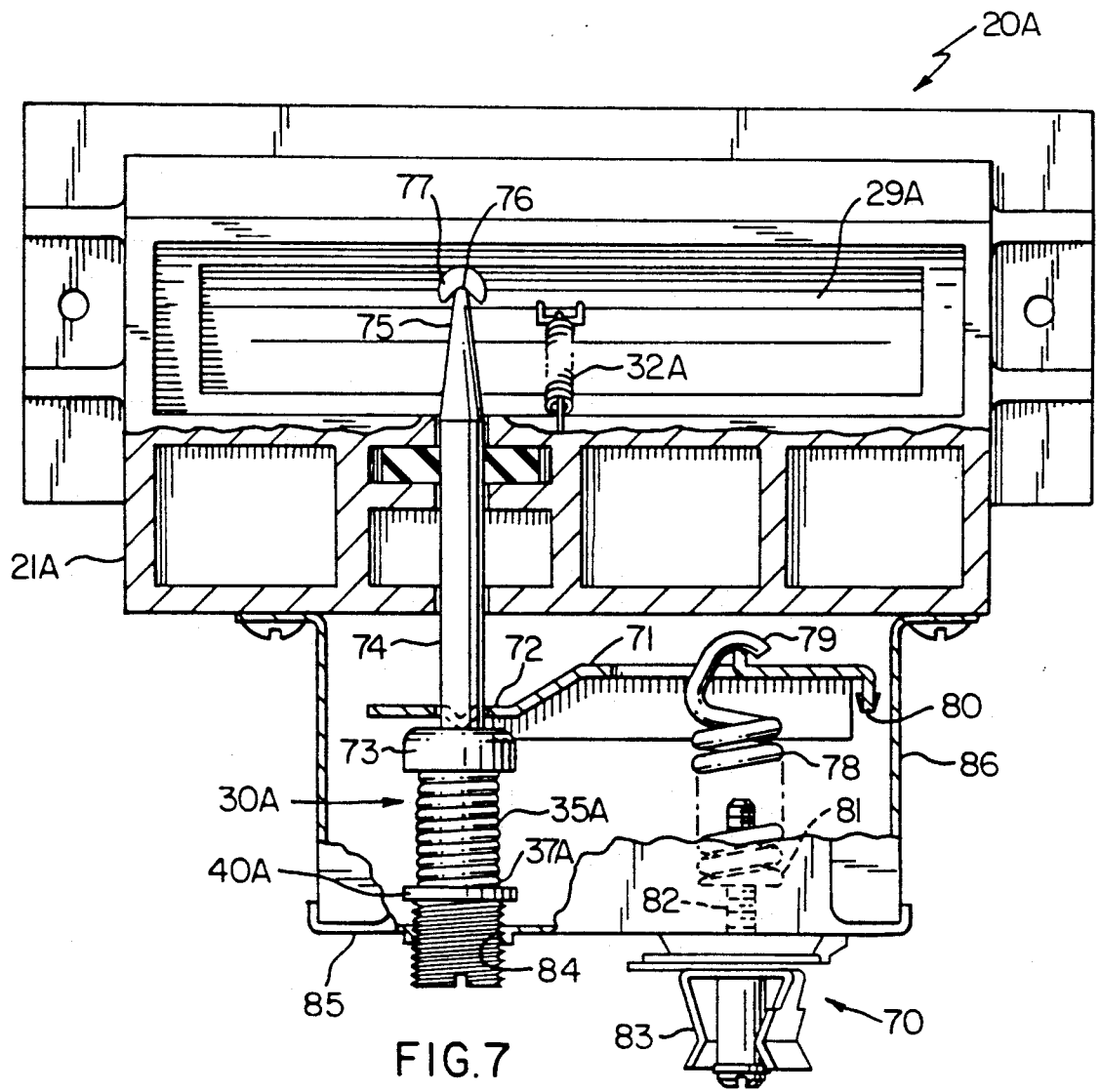
FIG. 7 is an end view of the control device of FIG. 6 and is taken in the direction of the arrows 7—7 of FIG. 8, FIG. 7 being partially broken away and partially in cross section.

In any event, the actuator 74 and adjusting member 40A are so constructed and arranged that when the adjusting member 40A has been properly adjusted relative to the bracket means 86, and the spring means 35A is sensing a temperature below a temperature that causes the same to be disposed in the closed coil bound condition of FIGS. 7 and 8, the tension spring 78 is pivoting the lever 71 so as to hold the actuator 74 against the end 39A of the spring 35A and thereby permit the valve member 29A to be disposed in its closed condition as illustrated in FIGS. 7 and 8 by the tension spring 32A as previously set forth.

However, when the spring 35A is sensing a temperature above another certain temperature that causes the spring 35A to axially expand in the manner illustrated in FIG. 9, it can be seen that the axially expanded spring 35A in opposition to the force of the tension spring 78, as well as the force of the tension spring 32A, axially moves the plunger 74 therewith to move the valve member 29A to the open condition as illustrated in FIG. 9 until the temperature of the spring means 35A again falls below the temperature which causes the same to move to the closed coil bound condition of FIGS. 7 and 8 to permit the valve member 29A to move to its closed condition.

It is believed that by merely selecting the proper materials for forming the spring means 35A, and disposing the spring means 35A so that the same is subject to the air of the refrigerator (not shown) that utilizes the system 25A, and through the control of the selector means 70 imposing the force of the tension spring 78 onto the coiled compression shape memory spring means 35A, the control device 20A in the system 25A can so operate in the manner previously set forth that the previously described heater means 53 is not needed and the actual air circulating around the spring 35A will control the expansion and contraction of the spring means 35A so as to tend to maintain a desired temperature in the nonfrozen food compartment 27A through the opening and closing of the valve member 29A as previously set forth.

While the shape memory means previously set forth for the control devices 20 and 20A have each comprised a coiled spring means, it is to be understood that the shape memory means can take other configurations if desired.

For example, reference is now made to FIGS. 10-15 wherein another control device of this invention is generally indicated by the reference numeral 20B and parts thereof similar to the control devices 20 and 20A previously set forth are indicated by like reference numerals followed by the reference letter "B".

The control device 20B comprises the housing means 21B that is provided with the valve seat means 24B that is adapted to be opened and closed by the pivotally mounted valve member 29B which is urged to its closed position by the tension spring 32B which has one end 34B thereof interconnected to an end 100 of a tang means 101 carried by the valve member 29B. The other end 33B of the tension spring 32B is adapted to be interconnected to the housing means 21B in any suitable manner such as in the manner illustrated in FIG. 4 for the tension spring 32 so that the end 37B thereof will provide a spring force represented by the arrow 102 in FIGS. 11 and 12 to tend to close the valve member 29B against the valve seat means 24B and thereby close the inlet means 22B from the outlet means 23B and thereby prevent the flow of cooling air from the frozen food compartment 26B to the nonfrozen food compartment 27B of the refrigerator system 25B utilizing the control device 20B for the purpose previously set forth.

The actuator means 30B for controlling the operation of the valve member 29B relative to the valve seat means 24B of the control device 20B comprises a shape memory wire 103 having opposed ends 104 and 105 respectively passing through openings 104' and 105' in the housing means 21B and being interconnected to the housing means 21B by fastening means 106 in a manner hereinafter set forth so that an intermediate portion 107 of the shape memory wire 103 hooks under a hook end 108 of the tang means 101 that is carried by the valve member 29B. The length of the fastened wire 103 in its unheated condition is such that when the valve member 29B is in its closed condition, the wire 103 is in the inverted V-shaped form illustrated in FIG. 13.

Figure 11:
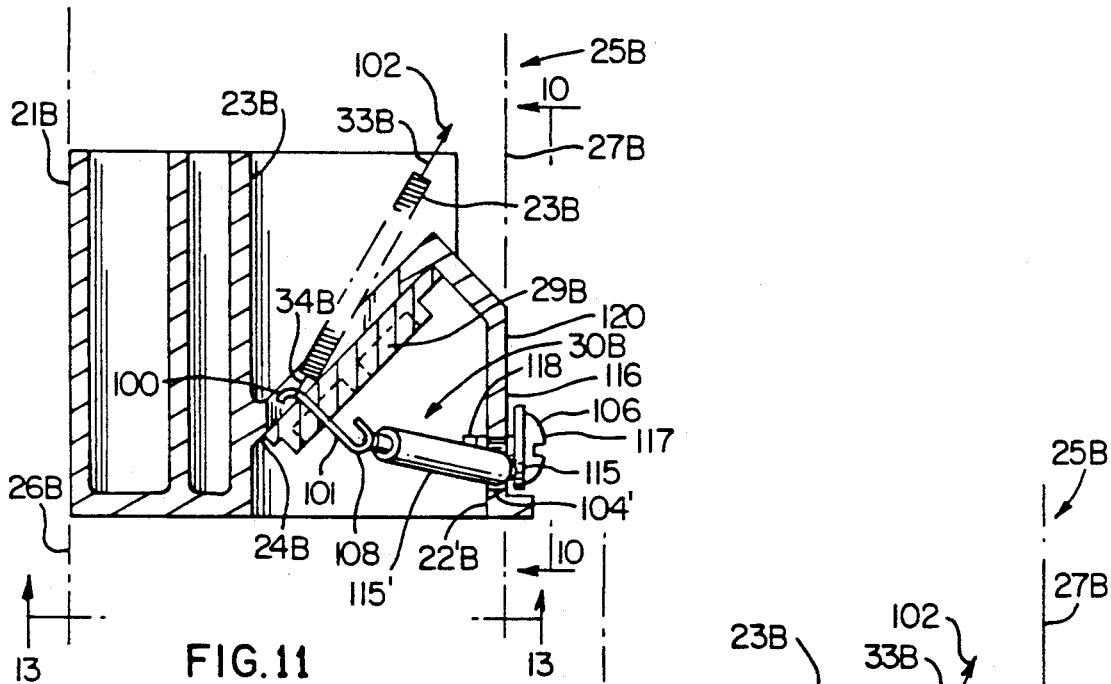
FIG. 11 is a cross-sectional view taken on line 11—11 of FIG. 10, FIG. 11 illustrating the valve member in its closed condition and the control device in a refrigerator system similar to FIG. 2.
Figure 12:
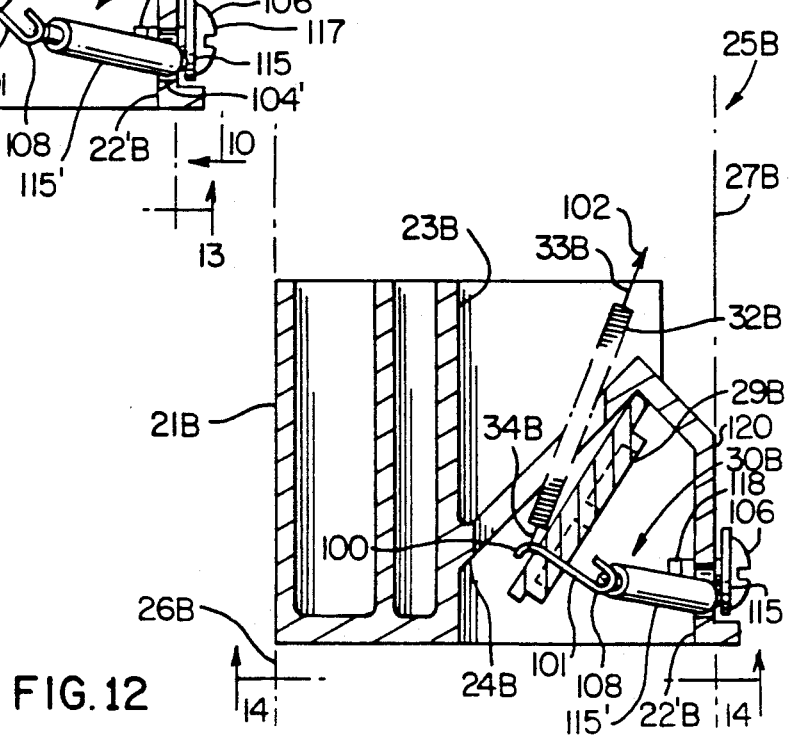
FIG. 12 is a view similar to FIG. 11 and illustrates the valve member in its open condition.

In this manner, when an electrical current passes through the shape memory wire 103 in a manner hereinafter set forth to heat the wire 103, the length of the shape memory wire 103 shortens between the ends 104 and 105 thereof when the temperature being sensed by the heated wire 103 reaches a temperature above a first temperature and such shortening of the wire 103 causes the valve member 29B to be pulled to the open condition thereof in opposition to the force of the tension spring 32B in the manner illustrated in FIGS. 12 and 14. However, when the electrical current through the shape memory wire 103 is terminated and the temperature being sensed by the wire 103 falls below a second temperature, the wire 103 lengthens between the opposed ends 104 and 105 thereof back to the length illustrated in FIGS. 11 and 13 whereby such lengthening of the wire 103 permits the tension spring 32B to pull the valve member 29B to its closed condition as illustrated in FIGS. 11 and 13.

While any suitable means can be provided for passing an electrical current through the wire 103 to cause opening of the valve member 29B, such as the means set forth in the aforementioned U.S. Pat. No. 4,284,235 to Diermayer et al., whereby this patent is being incorporated into this disclosure by this reference thereto, one such control means is indicated by the reference numeral 58B in FIGS. 13 and 14 and comprises a pair of electrical source leads 108 and 109 for electrically interconnecting to leads 110 and 111 respectively interconnected to the ends 104 and 105 of the shape memory wire 103 by suitable splice means 112 which comprises conductive clip means 113 crimping the end 104 or 105 of the wire 103 to the respective end 114 of the lead 110 or 111 in overlapping and conductive relation. If desired an additional length of conductive material 113' can be crimped by the clip means 113 in overlapping relation with the overlapped ends 104 or 105 and 114.

Each crimping means 113 is adapted to be disposed beneath a metallic washer 115 carried by the respective fastening member 106 and an external surface 116 of the housing means 21B in the manner illustrated in FIGS. 10-14.

In this manner, not only does the splicing means 112 interconnect the leads 110 and 111 to the ends 104 and 105 of the shape memory wire 103 so that the control means 58B can be electrically coupled to the leads 110 and 111 in any suitable manner without requiring connections to the shape memory wire 103, but also such splicing means 112 provides the means for the fastening members 106 to interconnect the ends 104 and 105 of the shape memory wire 103 to the housing means 21B without directly engaging the more fragile shape memory wire 103 itself.

In particular, each fastening member 106 can comprise an enlarged head 117 and a threaded shank portion 118 that is adapted to be threadedly disposed in a threaded opening 119 passing through a wall 120 of the housing means 21B as illustrated.

While the shape memory wire 103 can comprise any suitable shape memory wire means, one working embodiment thereof comprises a length of wire 103 that is approximately 4.50 inches to approximately 5.00 inches in length between the ends 104 and 105 thereof, is approximately 0.004 of an inch in diameter and is sold under the trade name Flexinol by Dynalloy, Inc. of Irvine, Calif. Such wire is a nickel based alloy that changes state at two defined temperatures such that the wire will shorten in length when heated beyond its upper transitional temperature by the electrical current passing through the wire 103 producing approximately 6 watts or less of power and return to its original length when cooled to its lower transitional temperature, the temperature induced lengthening and contracting of such wire being caused by an electrical current passing through the wire 103 in the control device 20B in the manner previously set forth.

While the tang means 101 is illustrated as being a member that projects through the opposed sides of the valve member 29B so as to provide the tang ends 100 and 108 respectively for the tension spring 32B and the shape memory wire 103, it is to be understood that the tang means 101 could comprise two separate members respectively for the tension spring 32B and the shape memory wire 103 and could be formed of any suitable material, such as nonconductive material, as desired.

If desired, a pair of tubular electrically insulating members 115 can be disposed over the shape memory wire 103 respectively between the intermediate portion 107 thereof and the splice areas 112 thereof as illustrated in FIG. 15.

It has been found according to the teachings of this invention that when a suitable electrical current flows through the shape memory wire 103, the same causes the valve member 29B to open approximately ¼ inch from the valve seat means 24B in just a few seconds after the electrical current begins to flow through the wire 103 and once the flow of electrical current through the wire 103 is subsequently terminated, the wire 103 lengthens to permit the valve member 29B to close the valve seat 24B also in a matter of a few seconds whereas in contrast in the heat motor operation of the control device in the aforementioned U.S. Pat. No. 4,530,216, to Sepso, a few minutes is required for the electrical current to flow through the heater means in order to open the valve member and similarly a few minutes is required for the heater means to cool down after the electrical current thereto is terminated in order for the valve member to close.

Since the operation of the control device 20B in the refrigerator system 25B is the same as the operation of the control devices 20 and 20A previously set forth, it is deemed unnecessary to set forth a description of the complete operation of the control device 20B of this invention other than to state that the shape memory wire 103 shortens sufficiently when an electrical current passes therethrough and heats the wire 103 to a temperature above its first transitional temperature so that the shortened wire 103 pulls the valve member 29B to the open condition in opposition to the force of the tension spring 32B and holds the valve member 29B in such open condition as long as the current continues to flow through the wire 103 and maintain a sensed temperature above that first transitional temperature Once the flow of electrical current through the wire 103 is terminated, the wire 103 cools to a temperature below a lower second transitional temperature thereof whereby the wire 103 lengthens and permits the tension spring 32B to move the valve member 29B back to its closed condition whereby the valve member 29B will remain in its closed condition until an electrical current is again passed through the wire 103 in the manner previously set forth Therefore, it can be seen that this invention not only provides a new control device and method of making the same, but also this invention provides a new refrigerator system and method of making the same.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a control device comprising a housing means having a valve seat means and having an inlet means and an outlet means interconnected together by said valve seat means, a movable valve member pivotally carried by said housing means and being adapted to open and close said valve seat means by being respectively pivoted to an open position thereof and a closed position thereof, said valve member having a medial portion, and a shape memory means carried by said housing means and being operatively interconnected to said valve member to pivot said valve member to one of said positions thereof by said shape memory means sensing a temperature above a first temperature and to pivot said valve member to the other of said positions thereof by said shape memory means sensing a temperature below a second temperature, the improvement wherein said shape memory means comprises a shape memory wire having opposed ends interconnected to said housing means and having an intermediate portion thereof operatively interconnected to said medial portion of said valve member.

2. A control device as set forth-in claim 1 wherein said valve member has a tang extending therefrom, said intermediate portion of said wire being hooked under said tang to be operatively interconnected to said valve member.

3. A control device as set forth in claim 1 and comprising two electrical leads electrically interconnected to said opposed ends of said wire.

4. A control device as set forth in claim 3 and comprising two splice means respectively interconnecting said leads to said opposed ends of said wire.

5. A control device as set forth in claim 4 and comprising two fastening means respectively fastening said splice means to said housing means whereby said opposed ends of said wire are interconnected to said housing means by said fastening means.

6. A control device as set forth in claim 5 and comprising insulation means covering said wire from adjacent said fastening means to adjacent said intermediate portion thereof.

7. In a control device for a refrigerator system having a frozen food compartment and a nonfrozen food compartment interconnected together by an air circulating means that is adapted to direct an air flow from said frozen food compartment to said nonfrozen food compartment when a valve member of said control device is in an open condition thereof, said control device comprising a housing means having a valve seat means and having an inlet means for interconnecting to said frozen food compartment and an outlet means for interconnecting to said nonfrozen food compartment, said valve seat means interconnecting said inlet means and said outlet means together, a movable valve member pivotally carried by said housing means and being adapted to open and close said valve seat means by being respectively pivoted to an open position thereof and a closed position thereof, said valve member having a medial portion, and actuator means carried by said housing means and being operatively interconnected to said valve member to pivot said valve member between said positions thereof, the improvement wherein said actuator means comprises a shape memory wire having opposed ends interconnected to said housing means and having an intermediate portion thereof operatively interconnected to said medial portion of said valve member so as to be adapted to pivot said valve member to said open position thereof by said wire sensing a temperature above a first temperature and to pivot said valve member to said closed position thereof by said wire sensing a temperature below a second temperature.

8. A control device as set forth in claim 7 wherein said valve member has a tang extending therefrom, said intermediate portion of said wire being hooked under said tang to be operatively interconnected to said valve member.

9. A control device as set forth in claim 7 and comprising two electrical leads electrically interconnected to said opposed ends of said wire.

10. A control device as set forth in claim 9 and comprising two splice means respectively interconnecting said leads to said opposed ends of said wire.

11. A control device as set forth in claim 10 and comprising two fastening means respectively fastening said splice means to said housing means whereby said opposed ends of said wire are interconnected to said housing means by said fastening means.

12. A control device as set forth in claim 11 and comprising insulation means covering said wire from adjacent said fastening means to adjacent said intermediate portion thereof.

13. In a refrigerator system having a frozen food compartment and a nonfrozen food compartment interconnected together by an air circulating means that has a control device therein for controlling the opening of said air circulating means between said compartments, said control device comprising a housing means having a valve seat means and having an inlet means for interconnecting to said frozen food compartment and an outlet means for interconnecting to said nonfrozen food compartment, said valve seat means interconnecting said inlet means and said outlet means together, a movable valve member pivotally carried by said housing means and being adapted to open and close said valve seat means by being respectively pivoted to an open position thereof and a closed position thereof, said valve member having a medial portion, and actuator means carried by said housing means and being operatively interconnected to said valve member to pivot said valve member between said positions thereof, the improvement wherein said actuator means comprises a shape memory wire having opposed ends interconnected to said housing means and having an intermediate portion thereof operatively interconnected to said medial portion of said valve member so as to be adapted pivot said valve member to said open position thereof by said wire sensing a temperature above a first temperature and to pivot said valve member to said closed position thereof by said wire sensing a temperature below a second temperature.

14. A system as set forth in claim 13 wherein said valve member has a tang extending therefrom, said intermediate portion of said wire being hooked under said tang to be operatively interconnected to said valve member.

15. A system as set forth in claim 13 and comprising two electrical leads electrically interconnected to said opposed ends of said wire.

16. A system as set forth in claim 15 and comprising two splice means respectively interconnecting said leads to said opposed ends of said wire.

17. A system as set forth in claim 16 and comprising two fastening means respectively fastening said splice means to said housing means whereby said opposed ends of said wire are interconnected to said housing means by said fastening means.

18. In a method of making a control device comprising a housing means having a valve seat means and having an inlet means and an outlet means interconnected together by said valve seat means, a movable valve member pivotally carried by said housing means and being adapted to open and close said valve seat means by being respectively pivoted to an open position thereof and a closed position thereof, said valve member having a medial portion, and a shape memory means carried by said housing means and being operatively interconnected to said valve member to pivot said valve member to one of said positions thereof by said shape memory means sensing a temperature above a first temperature and to pivot said valve member to the other of said positions thereof by said shape memory means sensing a temperature below a second temperature, the improvement comprising the step of forming said shape memory means to comprise a shape memory wire having opposed ends interconnected to said housing means and having an intermediate portion thereof operatively interconnected to said medial portion of said valve member.

19. In a method of making a control device for a refrigerator system having a frozen food compartment and a nonfrozen food compartment interconnected together by an air circulating means that is adapted to direct an air flow from said frozen food compartment to said nonfrozen food compartment when a valve member of said control device is in an open condition thereof, said control device comprising a housing means having a valve seat means and having an inlet means for interconnecting to said frozen food compartment and an outlet means for interconnecting to said nonfrozen food compartment, said valve seat means interconnecting said inlet means and said outlet means together, a movable valve member pivotally carried by said housing means and being adapted to open and close said valve seat means by being respectively pivoted to an open position thereof and a closed position thereof, said valve member having a medial portion, and actuator means carried by said housing means and being operatively interconnected to said valve member to pivot said valve member between said positions thereof, the improvement comprising the step of forming said actuator means to comprise a shape memory wire having opposed ends interconnected to said housing means and having an intermediate portion thereof operatively interconnected to said medial portion of said valve member to so as to be adapted to pivot said valve member to said open position thereof by said wire sensing a temperature above a first temperature and to pivot said valve member to said closed position thereof by said wire sensing a temperature below a second temperature.

20. In a method of making a refrigerator system having a frozen food compartment and a nonfrozen food compartment interconnected together by an air circulating means that is has a control device therein for controlling the opening of said air circulating means between said compartments, said control device comprising a housing means having a valve seat means and having an inlet means interconnecting to said frozen food compartment and an outlet means interconnecting to said nonfrozen food compartment, said valve seat means interconnecting said inlet means and said outlet means together, a movable valve member pivotally carried by said housing means and being adapted to open and close said valve seat means by being respectively pivoted to an open position thereof and a closed position thereof, said valve member having a medial portion, and actuator means carried by said housing means and being operatively interconnected to said valve member to pivot said valve member between said positions thereof, the improvement comprising the step of forming said actuator means to comprise a shape memory wire having opposed ends interconnected to said housing means and having an intermediate portion thereof operatively interconnected to said medial portion of said valve member so as to be adapted to pivot said valve member to said open position thereof by said wire sensing a temperature above a first temperature and to pivot said valve member to said closed position thereof by said wire sensing a temperature below a second temperature.

* * * * *